United States Patent Office 3,651,044
Patented Mar. 21, 1972

3,651,044
PROCESS FOR PREPARING 5-HALOCYTOSINE-
1-NUCLEOSIDES
James H. Hunter, Kalamazoo, Mich., assignor to The
Upjohn Company, Kalamazoo, Mich.
No Drawing. Filed Feb. 24, 1966, Ser. No. 529,626
Int. Cl. C07d 51/52
U.S. Cl. 260—211.5 R          5 Claims

ABSTRACT OF THE DISCLOSURE

Cytosine-1-nucleosides can be halogenated using an N-halo cyclic imide, e.g., N-bromosuccinimide. Glacial acetic acid is a preferred reaction medium. The novel compounds 1-β-D-arabinofuranosyl-5-(chloro-, bromo-, and iodo-) cytosine were prepared directly from cytosine arabinoside and found to have the antiviral and antitumor activity of cytosine arabinoside. The new compounds are less toxic in the animal body than cytosine arabinoside.

This invention pertains to a novel organic chemical process, and to novel compounds prepared by the process. The invention is more particularly directed to a novel process for preparing 5-halocytosine-1-nucleosides, and to novel 1-D-pentofuranosyl-4-amino-5-halo - 2(1H)pyrimidones, especially 1-β-D-arabinofuranosyl-5-halocytosines.

There are known processes for preparing 5-halocytosine-1-nucleosides, but the new process provides significant advantages. It is simple and direct, for example, a cytosine-1-nucleoside can be halogenated according to the process of this invention without protecting either the amino group of the cytosine base or the hydroxyl groups of the sugar. Complicating chemical procedures are thus avoided. Other advantages of the process will be apparent to those skilled in the art in addition to the new and useful 5-halocytosine-1-nucleosides it provides.

In accordance with the new process of this invention, 5-halocytosine-1-nucleosides are prepared by reacting a 5-unsubstituted cytosine-1-nucleoside with an N-halo cyclic imide. The discovery that 5-halogenation of a cytosine-1-nucleoside can be accomplished in this way is unexpected in view of the state of the art at the time this invention was made. As early as 1952, M. Z. Barakat and G. M. Mousa (J. Pharm. Pharmacol. 4, pp. 115–117) reported that the N-halo cyclic imide N-bromosuccinimide readily oxidizes primary alcohols to corresponding aldehydes and secondary alcohols to corresponding ketones. According to this information, one skilled in the art would expect the hydroxyl groups of sugars to be so oxidized. Barakat and Mousa further reported that the R group of a primary amine is vigorously converted to the corresponding R-aldehyde with liberation of ammonia. According to this information, one skilled in the art would expect the primary amino group of cytosine to be cleaved. These reactions of N-bromosuccinimide were confirmed in 1954 by P. F. Kruse, K. L. Grist, and T. A. McCoy (Anal. Chem. 26, pp. 1319–1322) and other N-halosuccinimides were said to react in the same manner.

More recently, D. Lipkin et al. [J. Biol. Chem. 238, pp. 2249–2250 (1963)] prepared 5-iodouridine triphosphate with N-iodosuccinimide, but noted, "Cytidine, in contrast to uridine is not iodinated by N-iodosuccinimde." They effected the 5-iodination of cytidine with iodine chloride in the presence of carbon tetrachloride. Similarly, A. M. Michelson [Jour. Chem. Soc. (1958), pp. 1957–1963] used N-bromosuccinimide to prepare 5-bromouridine-5'-phosphate.

Hence, the art knew that N-bromo- and N-iodosuccinimide could be used to prepare 5-halouracil-1-nucleosides, but did not know that these halogenating agents could be used to prepare 5-halogenated cytosine-1-nucleosides.

Cytosine-1-nucleosides have been 5-halogenated in other ways, however. For example, T. K. Fukuhara and D. W. Visser described [J.A.C.S. 77, pp. 2393–2395 (1955)] the synthesis of 5 chlorocytidine and 5-bromocytidine by a photocatalytic process using elemental chlorine and bromine (respectively) in the presence of anhydrous acetic acid. Their method has limited applicability however, because it requires a source of ultraviolet light and a quartz reaction vessel. Another objectionable aspect of the reaction is acetylation of the hydroxyl groups of the ribose. Deacetylation with ammonia is necessary.

In a similar way, D. M. Frisch and D. W. Visser prepared 5-chloro- and 5-bromodeoxycytidine [J.A.C.S. 81, pp. 1756–1758 (1959)].

An improved method for preparing 5-bromo-2'-deoxycytidine was described by P. K. Chang and A. D. Welch in 1961 (Biochem. Pharmacol. 6, pp. 50–52). Pyridine was used as the reaction medium with bromine dissolved in carbon tetrachloride. In 1963, Chang and Welch (J. Med. Chem. 6, pp. 428–430) described the preparation of 5-iodo-2'-deoxycytidine using iodic acid and 2'-deoxycytidine according to reaction conditions taught by Wirth et al. [Am. Chim. 634, p. 84 (1960)].

Now, the process of this invention provides a new and advantageous method for preparing a wide variety of 5-halocytosine-1-nucleosides, some of which are novel and have been discovered to be useful. The process can be illustrated as follows:

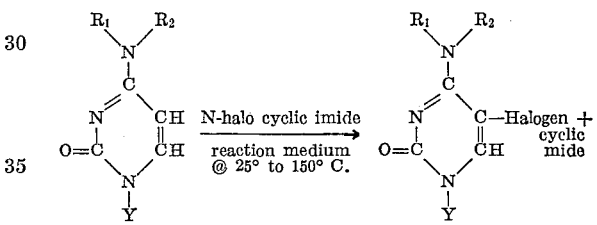

I

In the foregoing formulae, Y is any glycosido group,

is the amino group of a nitrogenous base having a dissociation constant, $K_b$, greater than about $1.0 \times 10^{-11}$ and no substituents reactive with halogen, and "Halogen" has an atomic weight between 35 and 131, inclusive.

Representative amino groups,

include those wherein $R_1$ and $R_2$ are singly selected from hydrogen; alkyl containing from 1 to 8 carbon atoms, inclusive, for example, methyl, ethyl, propyl, butyl, pentyl, hexyl, octyl, and isomeric forms thereof; aralkyl containing from 7 to 13 carbon atoms, inclusive, for example, benzyl, α- and β-phenethyl, benzhydryl and the like; aryl containing from 6 to 10 carbon atoms, inclusive, for example, phenyl, o-, m-, and p-tolyl, α- and β-naphthyl, and the like: cycloalkyl containing from 4 to 8 carbon atoms, for example, cyclobutyl, cyclopentyl, cyclohexyl, methylcycloheptyl, and the like; oxa- and C-aza-monoheterocyclic radicals, for example, furyl, pyrrolyl, and the like; oxa- and C-azamonoheterocyclic-lower-alkyl radicals, for example, furfuryl, β,β-dimethyl-β-(2-furyl)ethyl, and the like; and $R_1$ and $R_2$ selected as a unit with the —N< atom is a saturated heterocyclic amino group

of from 3 to 7 ring members, inclusive, the $R_1$–$R_2$ unit "Z" having a total of no more than 10 carbon atoms, one ring member of which is selected from carbon, nitrogen, or oxygen, the other ring members being carbon so that "Z" is alkylene, oxadialkylene, or azadialkylene.

Representative glycosido groups, Y, include D- and L-pentoses and hexoses, for example, D- and L-riboses, -yloses, -arabinoses, -lyxoses, -guloses, -mannoses, -alloses, -altroses, -galactoses, -glucoses, -deoxyriboses, -deoxyxylosses, -deoxyglucoses, and the like, in either the furanose or pyranose form and in either the $a$ or $\beta$ configuration. Illustratively, Y can be 1-$\beta$-D-arabinofuranosyl, 1-$\alpha$-L-arabinofuranosyl, 1-$\beta$-D-arabinopyranosyl, 1-$\beta$-D-xylofuranosyl, 1-$\beta$-D-lyxofuranosyl, 1-$\beta$-D-ribofuranosyl, 1-($\beta$-D-2-deoxyribofuranosyl), 1-$\alpha$-L-ribofuranosyl, 1-$\beta$-D-glucopyranosyl, 1-$\beta$-D-mannofuranosyl, 1-$\beta$-D-galactopylanosyl, and like forms of sugars as exemplified above.

The 5-halocytosine-1-nucleosides obtained by the process of this invention readily form acid addition salts with acids, for example, acids such as hydrochloric, picric, ictric, succinic, maleic, tartaric, thiocyanic, and fluosilicic acid. The acid addiiton salts are useful in purifying the free bases. The fluosilicate salts are useful as mothproofing agents in accordance with U.S. Pats. 1,915,334 and 2,075,359. The thiocyanate salts are useful for condensing with formaldehyde in accordance with U.S. Pats. 2,425,320 and 2,606,155 to form amine thiocyanate-formaldehyde condensation products for use as pickling inhibitors.

The novel 1-D-pentofuranosyl-5-halocytosines obtained by the process of this invention, particularly the 1-$\beta$-D-arabinofuranosyl-5-halocytosines, are useful in the study of nucleic acid metabolism, for synthesis of nucleotides and nucleic acids, and as chemotherapeutic agents. The compounds can be incorporated into growth media and with feedstuffs as a therapeutic source of cytosine base.

Some of the cytosine-1-nucleoside starting compounds of the process of the invention are readily available commercially. For example, 1-$\beta$-D-ribofuranosylcytosine (cytidine), 1-($\beta$-D-2-deoxyribofuranosyl)cytosine and 1-$\beta$-D-arabinofuranosylcytosine are commercially available. Other cytosine-1-nucleoside starting compounds including those having sugar groups different than the naturally occurring ones can be prepared according to the procedures described in U.S. Pat. 3,116,282; J.A.C.S. 81, pp. 4112–4113 (1959); J.A.C.S. 83, pp. 4066–4070 (1961); J.A.C.S. 58, pp. 60–62 (1936); Proc. Chem. Soc. 1962, p. 298; J.A.C.S. 86, pp. 5352–5354 (1964); and Canadian Pat. 713,547.

In accordance with the process of the invention, N-halocyclic imides wherein the halogen atom has an atomic weight between 35 and 131, inclusive, are effective halogenating agents for cytosine-1-nucleosides in the presence of an inert reaction medium. Reperesentative of N-halo cyclic imides include N-bromosuccinimide, N-chlorosuccinimide, N-iodosuccinimide, N-chloro-$\alpha$-methylsuccinimide, 1,3-diiodo-5,5-dimethylhydantoin, 1,3-dibromo-5,5-dimethylhydantoin, N-bromophthalimide, and the like.

The reaction between a cytosine-1-nucleoside and an N-halo cyclic imide proceeds readily at about 100° C. Lower or higher temperatures can be used if desired. Temperatures lower than about 25° C. will probably retard the reaction impracticably, while temperatures much above about 150° C. will probably promote undesirable side reactions, solvent evaporation, and decomposition of the cytosine-1-nucleoside. Equimolecular amounts of the nucleoside and the N-halo cyclic imide can be used, but an excess of the latter is preferred. In general a slight excess is sufficient to give satisfactory yields of 5-halocytosine-1-nucleoside.

Suitable inert reaction media include glacial acetic acid (preferred), dimethylformamide, formamide, N-methyl-pyrrolidone, dimethyl sulfoxide, diethyl phosphite, aqueous dioxane, and like liquids that are nonreactive with nucleosides. A reaction medium that is a solvent for both the nucleoside and the N-halo cyclic imide is particularly suitable, e.g., glacial acetic acid.

The 5-halocytosine-1-nucleoside is recovered from the reaction mixture by conventional methods, for example, evaporating the reaction medium to produce a concentrate, filtering, adsorption on and elution from resins, solvent extraction, precipitation, crystallization, and recrystallization.

The novel 1-$\beta$-D-arabinofuranosyl-5-halocytosines of this invention and their pharmacologically acceptable acid addition salts are active against viruses, illustratively, herpes simplex virus, pseudorabies virus, fowl pox virus, swine pox virus, vaccinia virus, and B-virus. In particular, the compounds are effective in the treatment of herpes simplex infections of mammals and birds; and they can be used to treat herpes simplex infections of the eyes.

The novel 1-$\beta$-D-arabinofuranosyl-5-halocytosines and their pharmacologically acceptable acid addition salts also inhibit proliferation of Eagle's KB human carcinoma cells and can be used to inhibit cell growth and proliferation. Illustratively, the compounds are perfused over a surgical field after excision of a tumor, in order to inhibit proliferation of any desquamative tumor cells that might seed surrounding tissues or be transported to other parts of the body.

Thus the new 1-$\beta$-D-arabinofuranosyl-5-halocytosines have the same chemotherapeutic activities as 1-$\beta$-D-arabinofuranosylcytosine itself. They have the advantage, however, of being less toxic to the animal body. The new compounds have, therefore, a higher therapeutic ratio than 1-$\beta$-D-arabinofuranosylcytosine.

The valuable anti-viral and anti-tumor cell activities of the new 1-$\beta$-D-arabinofuranosyl-5-halocytosines and their pharmacologically acceptable acid addition salts are utilized by contacting the compounds with the virus or with the tumor cells to be controlled. The desired contact is accomplished by infusing them by well-known methods into the milieu containing the virus or the tumor cells to be controlled. Hence, for example, a herpes simplex virus infection of the eyes of animals can be controlled by applying to the eyes an ophthalmic ointment containing a 1-$\beta$-D-arabinofuranosyl-5-halocytosine or acid addition salt. The compound thus applied to an infected tissue becomes dispersed throughout the tissue fluids and thus contacts the virus at the site of infection. The desired contact can also be accomplished systemically by formulating the compounds or their salts in compositions for oral or parenteral administration.

For oral administration 1-$\beta$-D-arabinofuranosyl-5-halocytosines and their pharmacologically acceptable acid addition salts can be formulated with a pharmaceutical carrier to give solid or fluid unit dosage forms.

Suitable solid forms include tablets, pills, capsules, granules, powders, suppositories, and the like. Advantageously, the pharmaceutical carrier for such solid forms include corn starch, lactose, dicalcium phosphate, terra alba (calcium sulfate), talc, stearic acid, magnesium stearate, and gums. Suitable fluid forms include solutions, suspensions, syrups, and emulsions. Advantageously, the pharmaceutical carrier for such fluid forms comprise water, oils, and water-oil emulsions. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Suitable oils, for solutions and water-oil emulsions include cottonseed oil, sesame oil, cocount oil, and peanut oil.

For parenteral administration, 1-$\beta$-D-arabinofuranosyl-5-halocytosines and their pharmacologically acceptable acid addition salts can be formulated in dilute aqueous solutions, aqueous suspensions, and oil dispersions for intramuscular injection, intravenous drip, vascular perfusion, or like routes. Advantageously, a solubilizer, for example, N,N-dimethylacetamide (preferred), N,N-dimethylformamide, ethanol, and the like can be utilized. If desired, other aqueous media such as water for injection, normal saline solution, Ringer's solution, blood plasma, and whole blood can be used.

Compositions of 1-β-D-arabinofuranosyl-5-halocytosines and their pharmacologically acceptable acid addition salts for application to a surgical field or other topical applications include powders (preferred), ointments, creams, pastes, jellies, and the like. Such compositions of the essential active ingredient can include emulsifying agents, solvents, antioxidants, preservatives, buffers, and bodying materials.

The dosage of 1-β-D-arabinofuranosyl-5-halocytosines and their pharmacologically acceptable acid addition salts depends upon the route of administration, the circumstances of treatment (e.g., severity of disease and length of treatment), as well as the patient's age, weight, and general physical condition. In general, a total daily dosage of from 0.1 to 50 mg./kg. is effective. Single daily, divided daily, or intermittent schedules can be employed. For surgical field treatment and other local and topical applications, formulations containing 0.5 to 25% of the active material, and preferably 2–5%, can be used. Higher concentrations than 25% can be used for some local applications.

The following examples are illustrative of the process and products of the present invention, but are not to be construed as limiting.

PREPARATION 1

1-(β-D-arabinofuranosyl)-N-methylcytosine and the hydrochloride

PART A.—PREPARATION OF 1-(2,3,5-TRI-O-ACETYL-β-D-ARABINOFURANOSYL)-4-THIOURACIL

A mixture of 1.85 g. (5.0 millimoles) of 1-(2,3,5-tri-O-acetyl-β-D-arabinofuranosyl)uracil, 1.23 g. (5.55 millimoles) of phosphorus pentasulfide, and 30 ml. of pyridine was heated under gentle reflux for 2.5 hours with exclusion of moisture. The reaction mixture was cooled, and the supernatant solution was transferred by means of a pipette into a mixture of crushed ice and water. The reaction flask was washed twice with pyridine, and these washings were added to the ice-water mixture. This mixture was kept at about 25° C. until the ice had melted, and was then stored at 0° C. for one hour. A pale yellow precipitate that formed was collected on a filter, washed with ice-water, and dried in air.

This material was triturated with chloroform, and the chloroform mixture was filtered. A small amount of undissolved material collected on the filter and it was washed with chloroform. The chloroform solution (filtrate plus washings) was washed three times with ice-water, twice with ice-cold 3 N sulfuric acid, twice with ice-cold, saturated aqueous sodium bicarbonate solution, twice with ice-water, and then dried over anhydrous sodium sulfate. The chloroform was removed under reduced pressure at a bath temperature of about 40° C., leaving a yellow, somewhat gummy residue. This yellow residue was dissolved in absolute methanol which was then evaporated at reduced pressure at about 40° C., and the residue was then held for 2 hours at 0.5 to 2.0 mm. pressure and a bath temperature of about 50° C. There was thus obtained 1.69 g. of 1-(2,3,5-tri-O-acetyl-β-D-arabinofuranosyl)-4-thiouracil.

PART B.—PREPARATION OF 1-(β-D-ARABINOFURANOSYL)-N-METHYLCYTOSINE

In a glass liner, 772 mg. (2.0 millimoles) of 1-(2,3,5-tri-O-acetyl-β-D-arabinofuranosyl)-4-thiouracil prepared as in Part A was dissolved in 50 ml. of absolute methanol which had been saturated with anhydrous methylamine at 0° C. The reaction mixture was then heated in a steel bomb at 95° to 105° C. for 24 hours. After cooling and venting the bomb, the methanolic solution in the glass liner contained crystals which were collected on a filter. The crystals were washed with cold absolute methanol and dried in air. There was obtained 465 mg. of 1-(β-D-arabinofuranosyl)-N-methylcytosine having a melting point of 257° to 260° C.

Ultraviolet Absorption:

$\lambda_{max.}^{0.1\,N\,HCl}$ 243 m$\mu$  $\lambda_{max.}^{0.1\,N\,HCl}$ 217 m$\mu$; 281–282 m$\mu$

PART C.—PREPARATION OF 1-(β-D-ARABINOFURANOSYL)-6-METHYLCYTOSINE HYDROCHLORIDE

Approximately 450 mg. of 1-(β-D-arabinofuranosyl)-N-methylcytosine prepared in Part B was comminuted to a fine powder, and the powder was suspended in 7 ml. of absolute methanol. Solution was effected by introducing an excess of anhydrous hydrogen chloride. The solution thus formed was warmed, stirred with decolorizing charcoal, and filtered through a bed of filter aid. The filter bed was washed with warm absolute methanol containing anhydrous hydrogen chloride, and the combined filtrate and washings were warmed and diluted with an equal volume of anhydrous ether. Crystallization occurred rapidly. The suspension of crystals was refrigerated at 0° C. for 12 hours and then at −20° C. for 3 hours. The crystals were collected in air. There was thus obtained 450 mg. of 1-(β-D-arabinofuranosyl)-N-methylcytosine hydrochloride, having a melting point of 182.5° to 184° C.

*Analysis.*—Calc'd for $C_{10}H_{16}ClN_3O_5$ (percent): C, 40.89; H, 5.49; Cl, 12.07; N, 14.34. Found (percent): C, 40.68; H, 5.07; Cl, 11.94; N, 14.46.

Optical Rotation: $[\alpha]_D^{23°} +127°$ (c. 0.444, H$_2$O).

PREPARATION 2

Using the method of Preparation 1, Part B, but substituting ethylamine, butylamine, isobutylamine, amylamine, octylamine, dimethylamine, diethylamine, dipropylamine, diamylamine, diheptylamine, cyclohexylamine, N-methylcyclopentylamine, benzylamine, furfurylamine, 2-aminopyrrole, ethyleneimine, piperidine, morpholine, aniline, phenethylamine and 2-methylpyrrolidine for methylamine, the corresponding N-substituted 1-β-D-arabinofuranosylcytosines are obtained, wherein the respective N-substituents are N-ethyl, N-butyl, N-isobutyl, N-amyl, N-octyl, N,N-dimethyl, N,N-diethyl, N,N-dipropyl, N,N-diamyl, N,N-diheptyl, N-cyclohexyl, N-methyl-N-cyclopentyl, N-benzyl, N-furfuryl, N-(2-pyrrolyl), N,N-ethylene, N,N-pentamethylene, N,N-(3-oxapentamethylene), N-phenyl, N-phenethyl, and N,N-(1-methyltetramethylene).

EXAMPLE 1

*Preparation of 1-β-D-arabinofuranosyl-5-chlorocytosine*

PART A.—PREPARATION OF 1-β-D-ARABINOFURANOSYL-5-CHLOROCYTOSINE FROM 1-β-D-ARABINOFURANOSYLCYTOSINE

A 547 mg. quantity (2.25 millimoles) of 1-β-D-arabinofuranosylcytosine was dispersed in 5 ml. of glacial acetic acid and heated on a steam bath. After a 334 mg. quantity (2.5 millimoles) of N-chlorosuccinimide was added, the solids dissolved quickly. Heating on the steam bath was continued for 2 hrs. The reaction mixture became pale yellow and trace amounts of an amorphous precipitate formed. After refrigeration at 80° C., the reaction mixture was concentrated to a thick syrup under reduced pressure and a bath temperature of 50° C. The concentrate was mixed with 4 ml. of 1 N acetic acid, and the mixture was chilled and filtered through a diatomaceous earth filter (Celite modified by two washings with 1 N hydrochloric acid, one washing with 0.5 N sodium hydroxide, separate washings with water, warm methanol, and anhydrous ether, and drying). The filter bed was washed with 1 ml. of 1 N acetic acid and the combined filtrate and acetic acid wash was passed through a column of an acidic cation exchange resin having sulfonic acid groups attached to a styrene polymer lattice cross-linked with divinylbenzene (Dowex 50W–X2) (particle size 50–100 mesh, in the hydrogen form). The resin column was 14 cm. long and 1.2 cm. in diameter. The resin was washed with 200 ml. of deionized water and elution effected with 0.5 N ammonium hydroxirde. The first 45 ml. of effluent was acidic and contained no detectable ultraviolet absorbing material. The pH of the next 5 ml. was significantly higher and ultraviolet absorption was noted. The ultraviolet absorbing material was present in further effluent samples through about 90 ml. All effluent fractions from 45 ml. to 90 ml. were combined and evaporated under reduced pressure at a temperature of about 50° C. The amorphous residue thus obtained was dissolved in methanol, and the methanol was evaporated under reduced pressure and a temperature less than 50° C. There was thus obtained 394 mg. of amorphous white solid. The amorphous white solid was dissolved in a mixture of methanol (6 parts), ethyl acetate (3 parts), and acetic acid (1 part) and the solution was passed over a silica gel column 45.5 cm. long and 2.2 cm. in diameter. The column was developed with more of the solvent mixture. Fractions were collected in 5 ml. volumes. Fractions 21 through 25 were combined and evaporated under reduced pressure. The syrup thus obtained was swirled with absolute ethanol and the ethanol was evaporated under reduced pressure to give a solid. The 259.3 mg. of essentially white amorphous solid was triturated first with acetone at about 25° C. and then with hot acetone. After drying in air the crystalline, hot acetone-insoluble solid weighed 92.1 mg. and melted at 203° to 207° C. Evaporation of the acetone from the acetone triturations gave crystals melting at 214° to 215° C. The hot acetone-insoluble solid (92.1 mg.) was dissolved in hot 95% aqueous ethanol and the solution was treated with decolorizing charcoal. The charcoal was removed by filtering the mixture through a layer of diatomaceous earth. The filter bed was washed with hot 95% ethanol, and the filtrate and washings were combined and concentrated to a volume of about 2 ml. After cooling, the concentrated solution was seeded with crystals of 1-β-D-arabinofuranosyl-5-chlorocytosine and held at about 25° C. for about 3 days. The crystals that formed were collected on a filter and washed with cold 95% ethanol. The crystals were dried in air. There was thus obtained 37.2 mg. of 1-β-D-arabinofuranosyl-5-chlorocytosine having a melting point of 211° to 214° C.

*Analysis.*—Calc'd for $C_9H_{12}ClN_3O_5$ (percent): Cl, 12.77. Found (percent): Cl, 12.64.

Ultraviolet absorption:

$\lambda_{max.}^{0.1\ N\ N\ HCl}$ 218 and 298 m$\mu$ ($\epsilon$ 12,400 and 11,550)

$\lambda_{max.}^{H_2O}$ 217 and 286 m$\mu$ ($\epsilon$ 12,600 and 7,950)

$\lambda_{max.}^{0.1\ NaOH}$ 221 and 289 m$\mu$ ($\epsilon$ 10,950 and 8,800)

Characteristic infrared absorption frequencies (cm.$^{-1}$):

NH/OH—3450, 3340, 3260, 3180
C=O—1650
C=C—1600, 1515, 1490
C—C/C—N—1125, 1090, 1050, 1030

Using the same method, but substituting N-chloro-α-methyl-succinimide and N-chlorophthalimide for N-chlorosuccinimide, there was obtained 1-β-D-arabinofuransoyl-5-chlorocytosine.

Using the same method, but substituting

1-β-D-arabinofuranosyl-N-methylcytosine,
1-β-D-arabinofuranosyl-N-ethylcytosine,
1-β-D-arabinofuranosyl-N-butylcytosine,
1-β-D-arabinofuranosyl-N-isobutylcytosine,
1-β-D-arabinofuranosyl-N-amylcytosine,
1-β-D-arabinofuranosyl-N-octylcytosine,
1-β-D-arabinofuranosyl-N,N-dimethylcytosine,
1-β-D-arabinofuranosyl-N,N-diethylcytosine,
1-β-D-arabinofuranosyl-N,N-dipropylcytosine,
1-β-D-arabinofuranosyl-N,N-diamylcytosine,
1-β-D-arabinofuranosyl-N,N-diheptylcytosine,
1-β-D-arabinofuranosyl-N-cyclohexylcytosine,
1-β-D-arabinofuranosyl-N-methyl-N-cyclopentylcytosine,
1-β-D-arabinofuranosyl-N-benzylcytosine,
1-β-D-arabinofuransoyl-N-furfurylcytosine,
1-β-D-arabinofuranosyl-N-(2-pyrrolyl)cytosine,
1-β-D-arabinofuranosyl-N,N-ethylenecytosine,
1-β-D-arabinofuranosyl-N,N-pentamethylenecytosine,
1-β-D-arabinofuransoyl-N,N-(3-oxapentamethylene)cytosine,
1-β-D-arabinofuranosyl-N-phenylcytosine,
1-β-D-arabinofuranosyl-N-phenethylcytosine, and
1-β-D-arabinofuranosyl-N,N-(1-methyltetramethylene)cytosine for 1-β-D-arabinofuranosylcytosine, there were prepared 1-β-D-arabinofuranosyl-5-chloro-N-methylcytosine,
1-β-D-arabinofuranosyl-5-chloro-N-ethylcytosine,
1-β-D-arabinofuranosyl-5-chloro-N-butylcytosine,
1-β-D-arabinofuranosyl-5-chloro-N-isobutyl cytosine,
1-β-D-arabinofuranosyl-5-chloro-N-amylcytosine,
1-β-D-arabinofuranosyl-5-chloro-N-octylcytosine,
1-β-D-arabinofuranosyl-5-chloro-N,N-dimethylcytosine,
1-β-D-arabinofuranosyl-5-chloro-N,N-diethylcytosine,
1-β-D-arabinofuranosyl-5-chloro-N,N-dipropylcytosine,
1-β-D-arabinofuranosyl-5-chloro-N,N-diamylcytosine,
1-β-D-arabinofuranosyl-5-chloro-N,N-diheptylcytosine,
1-β-D-arabinofuranosyl-5-chloro-N-cyclohexylcytosine,
1-β-D-arabinofuranosyl-5-chloro-N-methyl-N-cyclopentylcytosine,
1-β-D-arabinofuranosyl-5-chloro-N-benzylcytosine,
1-β-D-arabinofuranosyl-5-chloro-N-furfurylcytosine,
1-β-D-arabinofuranosyl-5-chloro-N-(2-pyrrolyl)cytosine,
1-β-D-arabinofuranosyl-5-chloro-N,N-ethylenecytosine,
1-β-D-arabinofuranosyl-5-chloro-N,N-pentamethylenecytosine,
1-β-D-arabinofuranosyl-5-chloro-N,N-(3-oxapentamethylene)cytosine,
1-β-D-arabinofuranosyl-5-chloro-N-phenylcytosine,
1-β-D-arabinofuranosyl-5-chloro-N-phenethylcytosine, and
1-β-D-arabinofuranosyl-5-chloro-N-(1-methyltetramethylene)cytosine, respectively.
methylene)cytosine, respectively.

PART B.—PREPARATION OF 1-β-D-ARABINOFURANOSYL-5-CHLOROCYTOSINE FROM 1-β-D-ARABINOFURANOSYLCYTOSINE HYDROCHLORIDE

A mixture consisting of 5.6 g. (20.0 millimoles) of 1-β-D-arabinofuranosylcytosine hydrochloride, 47 ml. of glacial acetic acid, and 3.73 g. (27.9 millimoles) of N-chlorosuccinimide was heated on a steam bath for 25 minutes with occasional mixing. The reaction mixture was cooled rapidly to about 25° C. and concentrated by evaporation under reduced pressure. The syrup that remained was mixed with absolute ethanol and the volatile components were again evaporated under reduced pressure. The same mixing with ethanol and evaporating under reduced pressure were repeated two times. There was thus obtained 12 g. of syrup which was dissolved in 35 ml. of 0.1 N acetic acid. The acid solution was transferred to a column of Dowex 50W–X2 resin 19 cm. long and 1.8 cm. in diameter. The last traces of syrup were transferred by rinsing the flask with three small portions of 0.1 acetic acid and two small portions of deionized water. The column of resin was washed once with water. Using the same amounts of reactants stated above and the same procedure described, a second batch of the syrup was adsorbed on the same resin column in the same way as described above. The resin column was then washed with 2000 ml. of deionized water and, after standing for several hours, was developed with approximately 0.5 N ammonium hydroxide. The eluate fractions up to and including 75 ml. had no ultraviolet absorbing component, but after 75 ml. an ultraviolet absorbing material was present. After collecting 100 ml. of the active eluate, the volatile components were removed by evaporation under reduced pressure and temperatures less than 50° C. The non-volatile residue thus obtained was mixed with absolute ethanol and the volatile components were again evaporated under reduced pressure. Washing with absolute ethanol and evaporation was repeated two times. The solid residue thus obtained (5.2 g.) was dissolved in a mixture of 10 ml. methanol and 10 ml. of a mixture of 45 parts ethyl acetate, 40 parts technical hexane (Skellysolve B, a mixture of isomeric hexanes having a boiling range at 60° to 71° C.), and 17.5 parts methanol and the solution was passed through a column of silica gel 104 cm. long and 2.8 cm. in diameter. The column was developed with the mixture of ethyl acetate, Skellysolve B, and methanol and 25 ml. fractions were collected. Of the 253 fractions collected, fractions 130 through 185 developed crystals on standing. The crystals were recovered by pouring off the liquid and washing the crystals with more of the solvent mixture. After combining the crystals from each fraction and drying there was thus obtained 1.83 g. of 1-$\beta$-D-arabinofuranosyl-5-chlorocytosine having a melting point of 212.5 to 214.5° C.

*Analysis.*—Calc'd for $C_9H_{12}ClN_3O_5$ (percent): C, 38.93; H, 4.36; Cl, 12.77; N, 15.14. Found (percent): C, 38.89; H, 4.22; Cl, 12.99; N, 15.11.

Optical rotation: $[\alpha]_D^{23°} = +89°$ (c. 1.0106 in dimethylformamide).

Ultraviolet absorption:

$\lambda_{max.}^{0.1 N\ HCl}$ 218 and 289 m$\mu$ ($\epsilon$ 12,250 and 11,750)

$\lambda_{max.}^{H_2O}$ 218 and 287 m$\mu$ ($\epsilon$ 12,100 and 7,700)

$\lambda_{max.}^{0.1 N\ NaOH}$ 221 and 290 m$\mu$ ($\epsilon$ 11,950 and 9,250)

An addtional 0.56 g. of 1-$\beta$-D-arabinofuranosyl-5-chlorocytosine was recovered by carefully reworking the mother liquors of fractions 130 through 185.

EXAMPLE 2

*Preparation of 1-$\beta$-D-arabinofuranosyl-5-bromocytosine*

Solution of 1.82 g. (7.5 millimoles) of 1-$\beta$-D-arabinofuranosylcytosine in 16 ml. glacial acetic acid was effected by heating on a steam bath. After adding 1.48 g. (8.3 millimoles) of N-bromosuccinimide, heating on the steam bath was continued for 15 minutes. The hot solution was cooled quickly to about 25° C. and concentrated by evaporating the acetic acid under reduced pressure. The syrup thus obtained was mixed with absolute ethanol and the ethanol was removed by evaporation under reduced pressure. The same mixing with absolute ethanol and evaporation under reduced pressure was repeated three times in order to remove traces of acetic acid. The semi-crystalline solide thus obtained was dissolved in about 10 ml. of hot ethanol, and the solution was held at about 25° C. for 16 hours. After removing the ethanol by evaporation under reduced pressure, the partially crystalline residue thus obtained was dissolved in a mixture of 7 ml. of absolute methanol and 5 ml. of a solvent mixture consisting of 5 parts ethyl acetate, 2 parts Skellysolve B, and 3 parts methanol. The solution was percolated through silica gel in a column 100 cm. long and 1.9 cm. in diameter. The column was developed with the solvent mixture consisting of 5 parts ethyl acetate, 2 parts Skellysolve B, and 3 parts methanol. Among the 184 5-ml. fractions collected, crystals developed spontaneously in fractions 93 through 114. The crystals in each of fractions 93 through 114 were recovered by pouring off the liquid and washing the crystalline product in each of the fractions with the cold solvent mixture of ethyl acetate, Skellysolve B, and methanol. The washings were added to the pooled supernatant liquid. After evaporating any solvent remaining on the crystals, they are combined to give 266.1 mg. of 1-$\beta$-D-arabinofuranosyl-5-bromocytosine having a melting point of 195° to 195.8° C.

*Analysis.*—Calc'd for $C_9H_{12}BrN_3O_5$ (percent): Br, 24.81. Found (percent): Br, 25.04.

Ultraviolet absorption:

$\lambda_{max.}^{0.1 N\ HCl}$ 216 and 300 m$\mu$ ($\epsilon$ 12,800 and 11,400)

$\lambda_{max.}^{H_2O}$ 218 sl. sh. and 288 m$\mu$ ($\epsilon$ 13,300 and 7,800)

$\lambda_{max.}^{0.1 N\ NaOH}$ 290 ($\epsilon$ 8,400)

Characteristic infrared absorption frequencies (cm.$^{-1}$):

NH/OH—3440, 3340, 3260, 3220
C═O/NH deformation/C═C/C═N—1635, 1590, 1500
C—O/C—N—1115, 1090, 1075, 1050, 1035

The combined supernatant liquids and washes from fractions 93 through 114 were concentrated by evaporating the volatile components under reduced pressure at a temperature less than about 50° C. There was thus obtained 406.3 mg. of white solid. The solid was dissolved in hot 95% ethanol and the ethanol solution was treated with decolorizing charcoal. The charcoal was removed by filtering over a bed of Celite, and the filter bed was washed with warm 95% aqueous ethanol. The 95% aqueous ethanol washes were combined with colorless filtrate and evaporated with gentle heating to a volume of about 5 ml. After allowing the heated concentrate to cool, seed crystals were added and the solution was stored at about 25° C. for 20 hrs. The solution was then refrigerated at 5° C. for 3 days. Crystals formed. They were collected on a filter, washed with cold 95% ethanol and then dried in air to give an additional 166 mg. of 1-$\beta$-D-arabinofuranosyl-5-bromocytosine having a melting point of 192.5° to 194.5° C.

*Analysis.*—Calc'd for $C_9H_{12}BrN_3O_5$ (percent): C, 33.55; H, 3.76; Br, 24.81; N, 13.04. Found (percent): C, 33.90; H, 3.21; Br, 24.98; N, 13.39.

Optical rotation: $[\alpha]_D^{23°} + 60°$ (c. 0.951 in dimethylformamide)

Ultraviolet absorption:

$\lambda_{max.}^{0.1 N\ HCl}$ 215.5 and 299 m$\mu$ ($\epsilon$ 13,100 and 11,250)

$\lambda_{max.}^{H_2O}$ 218 sh. and 288 m$\mu$ ($\epsilon$ 12,100 and 7,350)

$\lambda_{max.}^{0.1 N\ NaOH}$ 289 and broad sh. 345 m$\mu$ ($\epsilon$ 9,750 and 741)

Characteristic infrared absorption frequencies cm.$^{-1}$):

NH/OH—3440, 3340, 3260, 3220
C═O/NH deformation/C═C/C═N—1635, 1590, 1500
C—O/C—N—1115, 1090, 1075, 1050, 1035

Using the same method, but substituting

1-$\beta$-D-glucopyranosylcytosine,
1-$\beta$-L-lyxopyranosylcytosine,
1-($\beta$-D-2-deoxyxylofuranosyl)cytosine,
1-($\beta$-D-3-deoxyarabinofuransoyl)cytosine,
1-($\beta$-D-3-deoxyribofuranosyl)cytosine,
1-($\beta$-D-2,3-dideoxyribofuranosyl)cytosine,
1-($\beta$-D-2,5-dideoxyribofuranosyl)cytosine, and
1-($\beta$-D-2,3,5-trideoxyribofuranosyl)cytosine for 1-$\beta$-D-arabinofuranosylcytosine, there were prepared 1-$\beta$-D-glucopyranosyl-5-bromocytosine,
1-$\beta$-L-lyxopyranosyl-5-bromocytosine,
1-($\beta$-D-2-deoxyxylofuranosyl)-5-bromocytosine,
1-($\beta$-D-3-deoxyarabinofuranosyl)-5-bromocytosine,
1-($\beta$-D-3-deoxyribofuranosyl)-5-bromocytosine,
1-($\beta$-D-2,3-dideoxyribofuranosyl)-5-bromocytosine,
1-($\beta$-D-2,5-dideoxyribofuranosyl)-5-bromocytosine, and
1-($\beta$-D-2,3,5-trideoxyribofuranosyl)-5-bromocytosine, respectively.

EXAMPLE 3

*Preparation of 1-β-D-arabinofuranosyl-5-iodocytosine and hydrochloride thereof*

A suspension of 3.65 g. (15.0 millimoles) of 1-β-D-arabinofuranosylcytosine in 34 ml. of glacial acetic acid was warmed on a steam bath until the compound dissolved. To the hot solution was added 3.77 g. (16.7 millimoles) of N-iodosuccinimide. Heating on the steam bath was continued for 20 minutes. The acetic acid was then removed by evaporation under reduced pressure, and the solid residue thus obtained was triturated with absolute ethanol. The ethanol was removed by evaporation under reduced pressure. The solid thus obtained was triturated with absolute ethanol and the ethanol evaporated under reduced pressure three more times. The solid thus obtained was thoroughly and repeatedly triturated with anhydrous ether, and dried in air. The resulting yellow solid was triturated with 95% aqueous ethanol at about 25° C. The ethanol-insoluble solid was collected on a filter, washed first with 95% aqueous ethanol at 25° C., washed with cold absolute ethanol, and finally washed with anhydrous ether. The solid thus obtained was dried in air to give 4.82 g. (87.7% yield) of crude 1-β-D-arabinofuranosyl-5-iodocytosine having a melting point of 198° to 200° C. The crude compound was dissolved in hot water, and the aqueous solution was treated with decolorizing charcoal. The charcoal was removed by filtering through a pad of Celite. The pad was washed with hot water, and the washings were added to the original filtrate. After cooling, crystals began to form, The crystallizing mixture was held at 25° C. for 30 hrs. and then refrigerated at 5° C. The crystals were collected on a filter, washed with ice water, and dried. About 1.5 g. of the crystals was added to 50 ml. of boiling water, and the hot aqueous solution was filtered through Celite. The filter was washed with hot water and the washings were added to the colorless filtrate. After rapid cooling, crystallization commenced and was completed within a short time. The colorless needles were collected on a filter, washed with ice water, then with cold absolute ethanol, and finally with anhydrous ether. The crystals of 1-β-D-arabinofuranosyl-5-iodocytosine thus obtained after drying in air weighed 1.135 g. and had a melting point of 204° to 205° C.

*Analysis.*—Calc'd for $C_9H_{12}IN_3O_5$ (percent): C, 29.28; H, 3.28; I, 34.38; N, 11.38. Found (percent): C, 29.08; H, 3.18; I, 33.65; N, 11.25.

Optical Rotation: $[\alpha]_D^{230}$ +22° (c., 0.295 in dimethylformamide)

Ultraviolet Absorption:

$\lambda_{max.}^{0.1\,N\,HCl}$ 222 and 308 m$\mu$ ($\epsilon$ 13,750 and 9,250)

$\lambda_{max.}^{H_2O}$ 197, 216 and 294 m$\mu$ ($\epsilon$ 20,900, 15,500 and 6,200)

$\lambda_{max.}^{0.1\,N\,NaOH}$ 222 and 295 m$\mu$ ($\epsilon$ 15,200 and 7,200)

Characteristic infrared absorption frequencies (cm.$^{-1}$):

OH/NH—3430, 3340, 3300
C=O/C=C/C=N/NH deformation—1655, 1630, 1610, 1590, 1575, 1500
C—O/C—N—1100, 1070, 1055, 1020

Following the general procedure of Preparation 1, Part C, but substituting 1-β-D-arabinofuranosyl-5-iodocytosine for 1-β-D-arabinofuranosyl-N-methylcytosine, there was prepared 1-β-D-arabinofuranosyl-5-iodocytosine hydrochloride having a melting point of 166° to 169° C. (dec.).

*Analysis.*—Calc'd for $C_9H_{12}IN_3O_5 \cdot HCl$ (percent): C, 26.65; H, 3.23; N, 10.36. Found (percent): C, 26.71; H, 3.32; N, 10.21.

EXAMPLE 4

*Preparation of 1-β-D-ribofuranosyl-5-chlorocytosine*

A quantity (547 mg.; 2.25 millimoles) of 1-β-D ribofuranosylcytosine was dissolved in 5 ml. of glacial acetic acid by heating on a steam bath. After adding 334 mg. (2.5 millimoles) of N-chlorosuccinimide, heating on the steam bath was continued for 15 minutes. The reaction mixture was cooled rapidly to about 25° C. and concentrated by evaporating the acetic acid under reduced pressure. The syrup thus obtained was mixed with absolute methanol and the methanol was removed by evaporation under reduced pressure. Mixing with absolute methanol and evaporating the methanol under reduced pressure was repeated 8 times. The residue was stored in the refrigerator for about 15 hours, then dissolved in a mixture consisting of 3.8 ml. of absolute methanol and 3.5 ml. of a solvent mixture consisting of 5 parts ethyl acetate, 2 parts Skellysolve B, and 3 parts methanol. The solution was percolated through a column of silica gel 37.5 cm. long and 1.9 cm. in diameter (total volume of the silica gel column was about 103 ml.), followed by rinsings, first with 1.2 ml. of dry methanol and then with the solvent mixture consisting of 5 parts ethyl acetate, 2 parts Skellysolve B, and 3 parts methanol. The column was developed with the solvent mixture and 5-ml. fractions were collected. Fractions 36 through 55 were combined and the solvent was removed by evaporation under reduced pressure to give 247.5 mg. of a clear glass. The glass was washed with acetone and the acetone-insoluble material was collected and held under reduced pressure in the presence of anhydrous calcium sulfate. The dry, slightly gummy solid thus obtained was dissolved in about 2 ml. of 95% aqueous ethanol and 2 drops of water were added. Crystallization commenced immediately. The crystallizing mixture was kept at about 25° C. for several hours and stirred occasionally with scratching of the surface of the glass vessel. The mixture was refrigerated at about 5° C. for 2 hours. The crystals were then collected on a filter, washed with cold 95% aqueous ethanol and dried. There was thus obtained 60.8 mg. of 1-β-D-ribofuranosyl-5-chlorocytosine having a melting point of 190° to 191.5° C. Upon recrystallization from a small volume of 95% aqueous ethanol the compound had a melting point of 200° to 202° C.

Ultraviolet Absorption:

$\lambda_{max.}^{0.1\,N\,HCl}$ 218 and 298 m$\mu$ ($\epsilon$ 11,300 and 11,050)

Characteristic infrared absorption frequencies (cm.$^{-1}$):

OH/NH—3500, 3440, 3380, 3340, 3200
C=O—1635
C=C/C=N/NH deformation—1605, 1590, 1500
C—O/C—N—1095, 1055

EXAMPLE 5

*Preparation of 1-β-D-ribofuranosyl-5-iodocytosine*

A quantity (606 mg.; 2.5 millimoles) of 1β-D-ribofuranosylcytosine was dissolved in 5.55 ml. of glacial acetic acid by heating on a steam bath. To the hot solution was added 625 mg. (2.78 millimoles) of N-iodosuccinimide and heating was continued for 20 minutes. The reaction mixture was cooled rapidly and the acetic acid was removed by evaporation under reduced pressure. The residue thus obtained was triturated with absolute ethanol and allowed to stand at about 25° C. for several hours. The ethanol was removed by evaporation under reduced pressure. Trituration with absolute ethanol and evaporation of ethanol under reduced pressure was repeated 3 times. The residue thus obtained was held at about −14° C. for about 15 hours, before dissolving it in a mixture consisting of 12 ml. of methanol and 10 ml. of a solvent mixture consisting of 5 parts ethyl acetate, 2 parts Skellysolve B, and 3 parts methanol. The solution was percolated through a column of silica gel 109 cm. long and 1.9 cm. in diameter, and the column was developed with the solvent mixture consisting of 5 parts ethyl acetate, 2 parts Skellysolve B, and 3 parts methanol. Ten-ml. fractions were collected and fractions 60 through 120 were saved and combined for further workup. The solvent was removed by evaporation under reduced pressure, and the residue thus obtained was washed with absolute ethanol. After removing the ethanol by evaporation under reduced pressure, the residue thus obtained was triturated with acetone and the acetone suspension was filtered. The acetone-insoluble material on the filter was again triturated with acetone and again collected on a filter. The filter cake was washed with acetone, before dissolving the solids in absolute methanol. The methanolic solution was treated with activated charcoal and the charcoal suspension was filtered through a bed of Celite. The filter bed was washed with absolute methanol, and the filtrate and washings were combined and concentrated by evaporation under reduced pressure. The resulting solid was held under reduced pressure for several hours, and there was thus obtained 151.7 mg. of 1-β-D-ribofuranosyl-5-iodocytosine.

Ultraviolet Absorption:

$\lambda_{max.}^{0.1\ N\ HCl}$ 222 and 308 m$\mu$ ($\epsilon$ 13,750 and 8,500)

$\lambda_{max.}^{H_2O}$ 219 and 292 m$\mu$ ($\epsilon$ 15,200 and 5,800)

$\lambda_{max.}^{0.1\ N\ NaOH}$ 294 m$\mu$ ($\epsilon$ 6,050)

Characteristic infrared absorption frequencies (cm.$^{-1}$):
NH/OH—3410, 3320, 3200
C=O/C=C/C=N/NH deformation—1625, 1585, 1490
C—O/C—N—1285, 1100, 1050

EXAMPLE 6

*Preparation of 1-β-D-lyxofuranosyl-5-iodocytosine*

A quantity (546 mg.; 2.25 millimoles) of 1-β-D-lyxofuranosylcytosine was dissolved in 5 ml. of glacial acetic acid by heating on a steam bath. To the hot solution was added 564 mg. (2.5 millimoles) of N-iodosuccinimide. After continued heating on the steam bath for 15 minutes, the reaction mixture was chilled rapidly and held at −14° C. for several hours. The cold reaction mixture was then warmed to about 25° C. and triturated with anhydrous ether. The ether became dark and was withdrawn before repeating the trituration with fresh anhydrous ether. Trituration and removal of the anhydrous ether was repeated until the wash ether was essentially colorless. The solid was then triturated with cold absolute ethanol and the ethanol was removed by aspiration. The solid was again mixed with cold absolute ethanol and the mixture was filtered. The solid on the filter was washed separately with cold absolute ethanol and anhydrous ether, and dried. There was thus obtained 540 mg. (65.2% yield) of 1-β-D-lyxofuranosyl-5-iodocytosine having a melting point of 186 to 188° C. with decomposition. One recrystallization from water in the presence of activated charcoal gave an analytical sample melting at 196.5° to 197.5° C.

Optical Rotation: [α]$_D^{23°}$+9° (c., 0.4956 in dimethylformamide).

Ultraviolet Absorption:

$\lambda_{max.}^{0.1\ N\ HCl}$ 222 and 308 m$\mu$ ($\epsilon$ 14,950 and 9,250)

$\lambda_{max.}^{H_2O}$ 221 and m$\mu$ ($\epsilon$ 16,150 and 6,200)

$\lambda_{max.}^{0.1\ N\ NaOH}$ 222 and 294 m$\mu$ ($\epsilon$ 15,900 and 6,750)

Characteristic infrared absorption frequencies (cm.$^{-1}$):
NH/OH—3480, 3400, 3310, 3200, 3740
C=O/NH deformation/C=N/C=C—1650, 1615, 1590, 1500, 1485
C—O/C—N—1300, 1280, 1245, 1130, 1075, 1025

EXAMPLE 7

*Preparation of 1-β-D-xylofuranosyl-5-iodocytosine*

A quantity (564 mg.; 2.5 millimoles) of N-iodosuccinimide was added to a hot solution of 546 mg. (2.25 millimoles) of 1-β-D-xylofuranosylcytosine in 5 ml. of glacial acetic acid obtained by heating the nucleoside suspended in the glacial acetic acid on a steam bath. Heating the reaction mixture on the steam bath was continued for 15 minutes. The reaction mixture was then cooled and refrigerated at −14° C. overnight. The frozen reaction mixture was allowed to thaw at about 25° C. and was then diluted with 80 ml. of anhydrous ether. Clumps of solid material in the reaction vessel were crushed and the solids were collected on a filter. The dry, ether-insoluble solid was triturated with cold acetone, and the solids were again collected on a filter. The filter cake was washed repeatedly with cold acetone and anhydrous ether, and dried. The pale yellow solid thus obtained was ground to a powder and stirred with cold acetone. The acetone-insoluble solids were again collected on a filter, washed thoroughly with cold acetone and anhydrous ether, and dried. The pastel yellow crystals thus obtained had a melting point of about 199° to 200° C. A portion of this material was dissolved in hot water and the solution was stirred with activated charcoal. The charcoal was removed by filtering through a bed of Celite and the filter was washed with hot water (volume of filtrate and washings, 11 ml.). Crystallization in the combined filtrate and washing occurred spontaneously. After refrigerating the mixture at about 5° C., the white crystals that had formed were collected on a filter, washed successively with ice water, cold acetone, and anhydrous ether. The filter cake was dried under reduced pressure at 90° C., and there was thus obtained 437.2 mg. of 1-β-D-xylofuranosyl-5-iodocytosine having a melting point of 205.8° to 206.2° C.

*Analysis.*—Calc'd for C$_9$H$_{12}$IN$_3$O$_5$ (percent): C, 29.29; H, 3.28; I, 34.38; N, 11.38. Found (percent): C, 29.67; H, 2.98; I, 34.65; N, 11.60.

Optical Rotation: [α]$_D^{23°}$—18° C. (c., 0.2860 in 0.1 N hydrochloric acid)

Ultraviolet Absorption:

$\lambda_{max.}^{0.1\ N\ HCl}$ 221 and 308 m$\mu$ ($\epsilon$ 14,050 and 9,000)

$\lambda_{max.}^{H_2O}$ 220 and 293 m$\mu$ ($\epsilon$ 15,450 and 6,050)

$\lambda_{max.}^{0.1\ N\ NaOH}$ 294 m$\mu$ ($\epsilon$ 6,450)

Characteristic infrared absorption frequencies (cm.$^{-1}$):
NH/OH—3400, 3320
C=O/C=N/C=C/NH deformation—1655, 1610, 1585, 1485
C—O/C—N—1245, 1105, 1090, 1070

EXAMPLE 8

*Preparation of 1-β-D-arabinofuranosyl-5-iodo-N-methylcytosine*

Using the procedure of Example 3, but substituting 1-β-D-arabinofuranosyl-N-methylcytosine for 1-β-D-arabinofuranosylcytosine, there was prepared 1-β-D-arabinofuranosyl-5-iodo-N-methylcytosine.

EXAMPLE 9

*Preparation of 1-β-D-arabinofuranosyl-5-iodo-N,N-ethylenecytosine*

Using the procedure of Example 3, but substituting 1-β-D-arabinofuranosyl-N,N-ethylenecytosine for 1-β-D-arabinofuranosylcytosine, there was prepared 1-β-D-arabinofuranosyl-5-iodo-N,N-ethylenecytosine.

EXAMPLE 10

Following the procedure of Preparation 1, Part C, but substituting for 1-β-D-arabinofuranosyl-N-methylcytosine the novel 5-halocytosine-1-nucleosides prepared in Examples 1, 2, 8 and 9, there were prepared 1-β-D-arabinofuranosyl-5-chlorocytosine hydrochloride,
1-β-D-arabinofuranosyl-5-chloro-N-methylcytosine hydrochloride,
1-β-D-arabinofuranosyl-5-chloro-N-ethylcytosine hydrochloride, 1-β-D-arabinofuranosyl-5-chloro-N-butylcytosine hydrochloride,
1-β-D-arabinofuranosyl-5-chloro-N-isobutylcytosine hydrochloride,
1-β-D-arabinofuranosyl-5-chloro-N-amylcytosine hydrochloride,
1-β-D-arabinofuranosyl-5-chloro-N-octylcytosine hydrochloride,
1-β-D-arabinofuranosyl-5-chloro-N,N-dimethylcytosine hydrochloride,
1-β-D-arabinofuranosyl-5-chloro-N,N-diethylcytosine hydrochloride,
1-β-D-arabinofuranosyl-5-chloro-N,N-dipropylcytosine hydrochloride,
1-β-D-arabinofuranosyl-5-chloro-N,N-diamylcytosine hydrochloride,
1-β-D-arabinofuranosyl-5-chloro-N,N-diheptylcytosine hydrochloride,
1-β-D-arabinofuranosyl-5-chloro-N-cyclohexylcytosine hydrochloride,
1-β-D-arabinofuranosyl-5-chloro-N-methyl-N-cyclopentylcytosine hydrochloride,
1-β-D-arabinofuranosyl-5-chloro-N-benzylcytosine hydrochloride,
1-β-D-arabinofuranosyl-5-chloro-N-furfurylcytosine hydrochloride,
1-β-D-arabinofuranosyl-5-chloro-N-(2-pyrrolyl)cytosine hydrochloride,
1-β-D-arabinofuranosyl-5-chloro-N,N-ethylenecytosine hydrochloride,
1-β-D-arabinofuranosyl-5-chloro-N,N-pentamethylenecytosine hydrochloride,
1-β-D-arabinofuranosyl-5-chloro-N,N-(3-oxapentamethylene)cytosine hydrochloride,
1-β-D-arabinofuranosyl-5-chloro-N-phenylcytosine hydrochloride,
1-β-D-arabinofuranosyl-5-chloro-N-phenethylcytosine hydrochloride,
1-β-D-arabinofuranosyl-5-chloro-N-(1-methyltetramethylene)cytosine hydrochloride,
1-β-D-arabinofuranosyl-5-bromocytosine hydrochloride,
1-β-D-arabinofuranosyl-5-iodo-N-methylcytosine hydrochloride, and
1-β-D-arabinofuranosyl-5-iodo-N,N-ethylenecytosine hydrochloride, respectively.

EXAMPLE 11

*Ophthalmic aqueous drops*

1000 milliliters of drops is prepared as follows:

|  | G. |
|---|---|
| 1-β-D-arabinofuranosyl-5-iodocytosine hydrochloride | 10 |
| Polyethylene glycol 4000 | 120 |
| Polyvinylpyrrolidone | 1 |
| Myristyl-gamma-picolinium chloride | 0.2 |
| Water for injection q.s. ad, 1000 ml. | |

The ingredients are dissolved in the water. The resulting solution is sterilized by filtration and filled aseptically in sterile containers.

The application of one drop hourly to the eye is beneficial in the treatment of herpes simplex.

I claim:

1. The process for preparing 5-halocytosine-1-nucleosides of the formula:

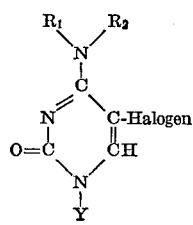

wherein "Halogen" has an atomic weight between 35 and 131, inclusive, wherein Y is the sugar of the nucleoside; and wherein

is the amino group of a nitrogenous base having a dissociation constant $K_b$ greater than about $1.0 \times 10^{-11}$ and no substituents reactive with halogen by reacting a cytosine-1-nucleoside with an N-halo cyclic imide selected from the group consisting of N-bromosuccinimide, N-chlorosuccinimide, N-iodosuccinimide, N-chloro-α-methylsuccinimide, 1,3-diiodo-5,5-dimethylhydantoin, 1,3-dibromo-5,5-dimethylhydantoin, and N-bromophthalimide in the presence of a solvent medium.

2. The process for preparing 5-halocytosine-1-nucleosides according to claim 1 of the formula:

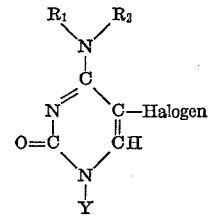

wherein "Halogen" has an atomic weight between 35 and 131, inclusive, wherein Y is the sugar of the nucleoside; and wherein

is the amino group of a group of a nitrogenous base having a dissociation constant $K_b$ greater than about $$1.0 \times 10^{-11}$$

and having:
(1) $R_1$ and $R_2$ singly selected from hydrogen; lower-alkyl; cycloalkyl containing from 4 to 8 carbon atoms, inclusive; furyl; pyrrolyl; furfuryl; β,β-dimethyl-β-(2-furyl)ethyl; aryl containing from 6 to 10 carbon atoms, inclusive; and aralkyl containing from 7 to 13 carbon atoms, inclusive; and
(2) $R_1$ and $R_2$ selected as a unit with the —N< atom thus forming a saturated heterocyclic amino group

of from 3 to 7 ring members, inclusive, the $R_1$–$R_2$ unit "Z" having a total of no more than 10 carbon atoms, one ring member of which is selected from carbon, nitrogen, or oxygen, so that "Z" is alkylene, oxadialkylene, or azadialkylene;
by reacting a cytosine-1-nucleoside with an N-halo cyclic imide selected from the group consisting of N-bromosuccinimide, N-chlorosuccinimide, N-iodosuccinimide, N-chloro-α-methylsuccinimide, 1,3-diiodo-5,5-dimethylhydantoin, 1,3-dibromo-5,5-dimethylhydantoin, and N-bromophthalimide in the presence of a solvent medium.

3. The process for preparing 5-halocytosine-1-nucleosides according to claim 2 by reacting a cytosine-1-nucleoside with an N-halosuccinimide wherein "halo" is a halogen atom having an atomic weight between 35 and 131, inclusive.

4. The process according to claim 9 wherein the reaction is effected at about 100° C. with the reactants dissolved in glacial acetic acid.

5. The process for preparing 1-β-D-pentofuranosyl-5-halocytosine according to claim 3 which comprises reacting a 1-β-D-pentofuranosylcytosine with an N-halosuccinimide.

(References on following page)

References Cited

UNITED STATES PATENTS

| | | | | |
|---|---|---|---|---|
| 3,328,388 | 6/1967 | Shen et al. | 260—211.5 | |
| 3,338,882 | 8/1967 | Wechter | 260—211.5 | |

LEWIS GOTTS, Primary Examiner

J. R. BROWN, Assistant Examiner

U.S. Cl. X.R.

424—180